(12) United States Patent
Mullins et al.

(10) Patent No.: US 11,126,703 B2
(45) Date of Patent: Sep. 21, 2021

(54) IDENTITY ASSURANCE USING POSTURE PROFILES

(71) Applicant: EMC IP Holding Company LLC, Hopkinton, MA (US)

(72) Inventors: Brian C. Mullins, Burlington, MA (US); Kevin Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 252 days.

(21) Appl. No.: 16/402,517

(22) Filed: May 3, 2019

(65) Prior Publication Data

US 2020/0349243 A1 Nov. 5, 2020

(51) Int. Cl.
*G06F 21/32* (2013.01)
(52) U.S. Cl.
CPC .................................. *G06F 21/32* (2013.01)
(58) Field of Classification Search
None
See application file for complete search history.

(56) References Cited

U.S. PATENT DOCUMENTS

| | | | |
|---|---|---|---|
| 2008/0127296 A1* | 5/2008 | Carroll | G06F 21/33 726/1 |
| 2009/0006254 A1 | 1/2009 | Mumm et al. | |
| 2010/0050243 A1 | 2/2010 | Hardt | |
| 2010/0293600 A1 | 11/2010 | Schechter et al. | |
| 2011/0231310 A1* | 9/2011 | Roberts | G06Q 20/32 705/40 |
| 2012/0313754 A1 | 12/2012 | Bona | |
| 2016/0092671 A1 | 3/2016 | Andreeva | |
| 2016/0253490 A1* | 9/2016 | Hong | G06F 21/36 726/7 |
| 2017/0012996 A1 | 1/2017 | Hu et al. | |
| 2017/0026422 A1 | 1/2017 | Klein | |

(Continued)

FOREIGN PATENT DOCUMENTS

CN 110968854 A * 4/2020

OTHER PUBLICATIONS http://www.sestek.com/2015/11/a-security-question-for-organizations-passive-or-active-voice-authentication/, downloaded on Jan. 9, 2019.

(Continued)

*Primary Examiner* — Joseph P Hirl
*Assistant Examiner* — Hassan Saadoun
(74) *Attorney, Agent, or Firm* — Ryan, Mason & Lewis, LLP

(57) ABSTRACT

Techniques are provided for identity assurance using a posture profile. One method comprises obtaining a posture profile of a user indicating a behavior of the user while sitting in a seat and/or standing on a mat; performing the following steps, in response to a request of the user to obtain access to a protected resource: receiving identity assurance information comprising: (i) configuration information about a configuration of the seat and/or the mat at a time of the request of the user; and/or (ii) user information about the user one or more of: sitting in the seat and standing on the mat at the time of the request of the user; determining if the identity assurance information satisfies a predefined identity assurance criteria; and providing an identity assurance result.

20 Claims, 6 Drawing Sheets

(56) References Cited

U.S. PATENT DOCUMENTS

| | | | |
|---|---|---|---|
| 2017/0104597 A1 | 4/2017 | Negi et al. | |
| 2017/0373861 A1 | 12/2017 | Jain | |
| 2018/0025140 A1* | 1/2018 | Edelman | G06F 21/316 |
| | | | 726/7 |
| 2018/0052982 A1* | 2/2018 | Kingsbury | G06F 21/316 |
| 2018/0053352 A1 | 2/2018 | Finding | |
| 2018/0068103 A1 | 3/2018 | Pitkanen | |
| 2018/0232937 A1 | 8/2018 | Moyer | |
| 2019/0104409 A1 | 4/2019 | Wu | |
| 2019/0311096 A1 | 10/2019 | Eldefrawy | |
| 2020/0134159 A1 | 4/2020 | Ford | |

OTHER PUBLICATIONS

Ping Identity, Authentication Authority, Connect Any User with Any Application, https://www.pingidentity.com/en/platform/authentication-authority.html, downloaded Jan. 11, 2019.

NIST, Special Publication 800-63, www.nis.gov/itl/tig/projects/special-publication-800-63, May 2, 2016.

Park et al. Self-Controllable Secure Location Sharing for Trajectory-Based Message Delivery on Cloud-Assisted VANETs, Sensors (Basel) Jul. 2018; 18(7); 2112. https://www.ncbi.nlm.nih.gov/pmc/articles/PMC6068972/.

Pokémon GO, Pokémon Video Games, © 2019 Pokémon. TM, ® Nintendo. https://www.pokemon.com/us/pokemon-video-games/pokemon-go/.

U.S. Appl. No. 16/263,276, filed Jan. 31, 2019, entitled: "Account Recovery Using Identity Assurance Scoring System."

U.S. Appl. No. 16/261,941, filed Jan. 30, 2019, entitled: "Location Assurance Using Location Indicators Modified by Shared Secrets."

* cited by examiner

| Identity Assurance Entropy Sources 210 | Assigned Identity Assurance Values 230 |
|---|---|
| Total Weight | 90% |
| Weight Distribution | 95% |
| Extremity Position | 85% |
| Smart Device Configuration | 100% |
| Smart Device Location | 100% |
| User Movement Patterns | 75% |
| User Changes Positions | 25% |

FIG. 2

IDENTITY ASSURANCE USING POSTURE PROFILES

FIELD

The field relates generally to information processing systems, and more particularly to access control techniques in such systems.

BACKGROUND

In order to gain access to applications or other resources via a computer or another user device, users are often required to authenticate themselves by entering authentication information. Identity assurance techniques (e.g., for establishing an identity of a user at a time of an authentication) can be used as a mechanism for increasing the amount of security required to access protected resources.

Many existing authentication methods represent varying degrees of security and convenience. Authentication factors typically fall into one of three categories, namely, something you have (e.g., a device or token); something you know (e.g., a password or personal identification number); and something you are (primarily, a biometric sample, such as a fingerprint, a face print, an iris scan, a retina scan, a voice print, a gait, or a voiceprint).

A need exists for improved techniques for obtaining identity assurances.

SUMMARY

In one embodiment, a method comprises obtaining a posture profile of a user indicating a behavior of the user while: (a) sitting in a seat, and/or (b) standing on a mat; performing the following steps, in response to a request of the user to obtain access to a protected resource: receiving identity assurance information comprising: (i) configuration information about a configuration of the seat and/or the mat at a time of the request of the user; and/or (ii) user information about the user one or more of: sitting in the seat and standing on the mat at the time of the request of the user; determining if the identity assurance information satisfies a predefined identity assurance criteria; and providing an identity assurance result.

In some embodiments, the posture profile is obtained based on information from one or more of: (i) a smart device comprising one or more of a smart seat and a smart mat, wherein the smart device measures information about the user while one or more of sitting and standing, respectively; and (ii) a visual analysis of images of the user while one or more of sitting and standing. The obtained posture profile of the user is optionally updated over time and can be shared across multiple devices of the user. Among other benefits, the disclosed posture profile-based identity assurance techniques allow a predefined access control policy to be applied for the protected resource based on the posture profile.

Other illustrative embodiments include, without limitation, apparatus, systems, methods and computer program products comprising processor-readable storage media.

BRIEF DESCRIPTION OF THE DRAWINGS

FIG. 2 is a sample table for an exemplary identity assurance database, according to one or more embodiments;

DETAILED DESCRIPTION

Figure 1:
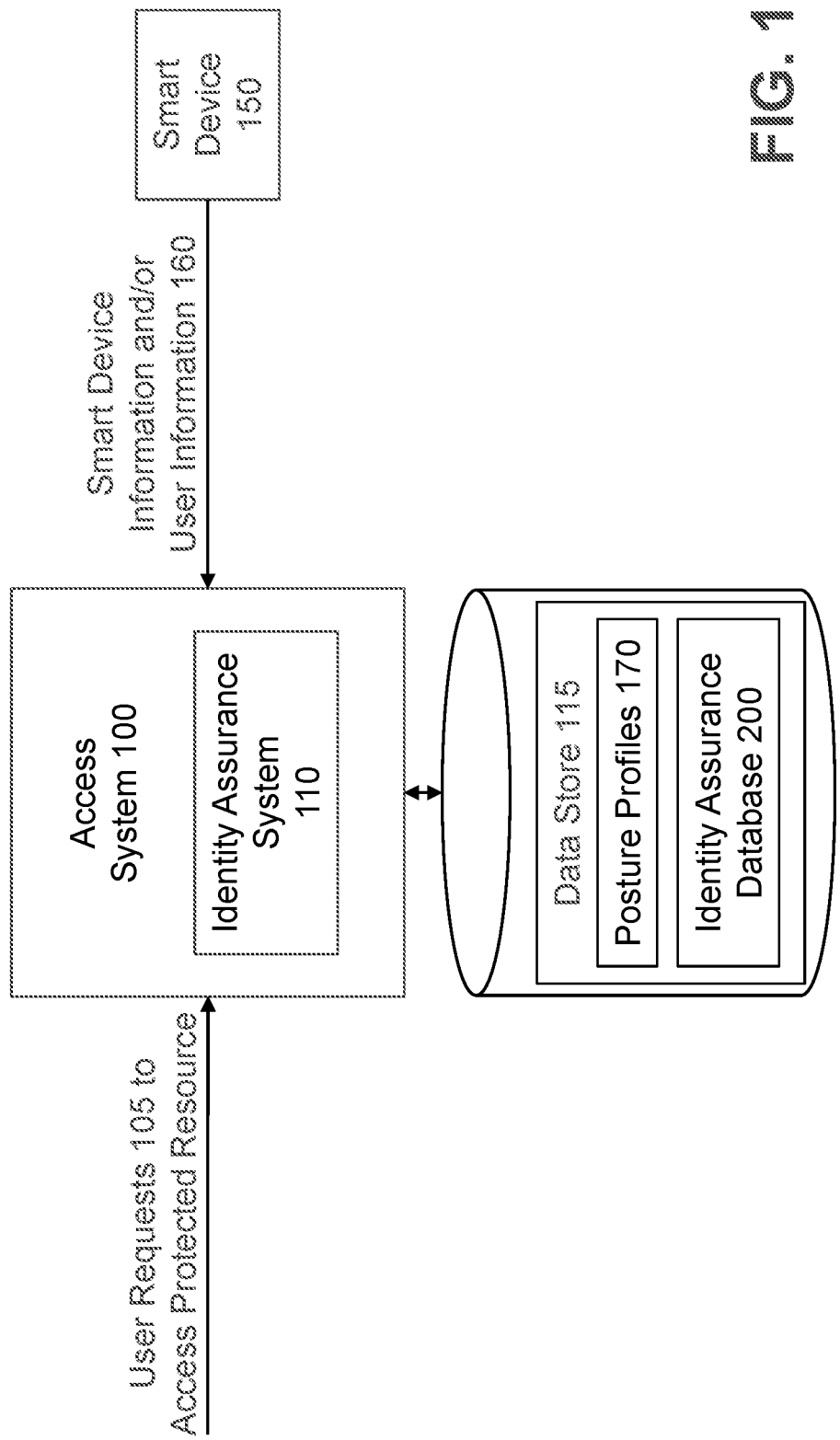
FIG. 1 illustrates an access control system, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for identity assurance using a posture profile indicating characteristics of a user while sitting in a seat, laying on a bed (or another substantially horizontal surface) and/or standing on a mat. The terms "seat," "bed" and "mat" are to be broadly construed to cover any devices that a user interacts with variations of body position. In particular, the term "seat" shall be broadly construed to cover any device where a user sits, and/or lays down in a substantially horizontal position.

In one or more embodiments, identity assurance techniques are provided that consider a posture profile indicating characteristics of a user while sitting in a seat, laying on a bed and/or standing on a mat, as discussed further below. The improved identity assurance techniques may increase security, for example, in the context of continuous authentication while in an office setting, as well as other environments such as operating a vehicle.

Generally, the disclosed identity assurance techniques provide a mechanism for proving a user identity based upon a posture profile of the user and how the user sits in a chair and/or stands on a mat. Based upon the characteristics of the chair, for example, and the behavior of the user while seated in the chair, data can be gathered that can be used to create an identity assurance.

As noted above, one or more embodiments of the disclosure provide improved identity assurance techniques that provide a higher assurance level about the identity of a claimant. In some embodiments, the disclosed identity assurance techniques determine an identity assurance score that uses a posture profile indicating characteristics of a user while sitting in a seat and/or standing on a mat. When the overall identity assurance score of the user exceeds a predefined threshold, for example, that is set by a security officer or an administrator, the user can obtain access to a protected resource, such as a protected application.

Modern user authentication solutions often employ device-side authenticators that provide secure and convenient user authentication. Such solutions aim at replacing passwords as the only or as the primary means of user verification. Examples of such authenticators include out-of-band (OOB) authenticators (e.g., SMS One-Time Passcode (OTP), and/or mobile push notifications); single factor tokens (e.g., RSA PINless SecurID® token from Dell EMC of Hopkinton, Mass.); multi-factor tokens (e.g., RSA PIN-full SecurID® token from Dell EMC of Hopkinton, Mass.; and/or RSA PIN/Biometric Protected Mobile Authenticate application from Dell EMC of Hopkinton, Mass.); single-factor cryptographic devices (e.g., FIDO U2F (Universal Second Factor) from the FIDO Alliance; PINless Smartcards; and/or Soft Certificates); and/or multi-factor cryptographic devices (e.g., FIDO2 Authenticators from the FIDO Alliance; and/or PIN Smartcards). The authenticators offer a higher authentication assurance level when used in combination with memorable secrets, such as a password (e.g., password plus OOB SMS, password plus "tap and go" FIDO authenticators) or alone (e.g., PIN protected smartcards; and/or biometric enabled FIDO authenticators). The FIDO standard, discussed further below, establishes a set of specifications for developing and implementing such authenticators.

In one or more embodiments, the present disclosure provides improved techniques for evaluating an identity assurance. The disclosed techniques can be used, for example, for accessing protected resources, including emergency access, account recovery and/or recreation of a primary authentication device.

In some embodiments, a smart device, such as a smart seat, a smart bed and/or a smart mat, is employed that can measure information about a person and the smart device, and make the measured information available to nearby devices. In one exemplary embodiment, the smart device can employ an application programming interface (API) that transmits data, for example, over Bluetooth low-energy (BLE). At a minimum, the smart device could report on its configuration (e.g. height and/or tilt) and be instrumented with sensors to capture other data, such as total weight of the person, weight distribution, and movement patterns. In an alternate embodiment for smart devices that are directly integrated into objects like cars, a more direct communication channel could be utilized in lieu of BLE. Note that a "dumb" device could also be converted into a smart device by overlaying the device, for example, with an instrumented cover.

In at least one embodiment, the posture profile may incorporate predefined body movements with the smart device, such as a predefined sequence of movements (e.g., a predefined dance).

FIG. 1 illustrates an access control system 100, according to an embodiment of the disclosure. As shown in FIG. 1, the exemplary access control system 100 processes user requests 105 to access a protected resource (e.g., an account). In some embodiments, an authentication system may require the user to assert and/or reassert his or her identity (often referred to as an "identity assertion") to obtain access to, for example, an account or another protected resource.

The exemplary access control system 100 comprises an identity assurance scoring system 110, as discussed further below in conjunction with FIG. 3. The exemplary access control system 100 accesses a data store 115 comprising, for example, one or more posture profiles 170 to allow a user to assert his or her identity, and an identity assurance database 200 assigned to various aspects of the posture profiles 170, as discussed further below in conjunction with FIG. 2.

In one or more embodiments of the disclosure, a user interacts with a smart device 150, such as a smart chair and/or a smart mat, and the smart device 150 provides smart device information and/or user information 160. For example, the smart device information provided by the smart device 150 may comprise a configuration of one or more aspects of the smart device 150, such as height, tilt, and/or lumbar settings, as well as an arm height and/or rotation). In addition, the user information provided by the smart device 150 may include, for example, a total weight and/or weight distribution, as well as a position of one or more body extremities (e.g., an arm or foot position).

FIG. 2 is a sample table for an exemplary identity assurance database 200, according to one or more embodiments. As shown in FIG. 2, the exemplary identity assurance database 200 comprises an exemplary set of identity assurance entropy sources 210 (with respect to user posture profiles 170 and smart devices) and corresponding exemplary assigned identity assurance values 230. Generally, a user must establish his or her identity with an acceptable assurance level, whether for temporary access or for replacement of an authenticator. FIG. 2 illustrates some representative means by which such identity assurance (e.g., using various combinations of user characteristics while interacting with a smart device, as well as various characteristics of the smart device itself when used by a respective user).

In the exemplary embodiment of FIG. 2, there are a number of exemplary sources of entropy available through a smart device 150, including but not limited to a total user weight; a user weight distribution; a user extremity position (such as position of user arms and/or feet); a smart device configuration (e.g., height; tilt; and lumbar settings of a smart seat; arm height; arm rotation; and whether a swivel lock and/or a tilt lock are enabled); a smart device location (e.g., expressed global positioning system (GPS) coordinates); user movement patterns (e.g., user swivels left/right, backwards or tilt); and a change of user position (e.g., detect that the user gets out of the smart seat, or steps off of a smart mat).

As shown in FIG. 2, each of the exemplary sources of entropy available through a smart device 150 have a corresponding assigned identity assurance value 230, that is used to determine and evaluate an identity assurance value, as discussed further below in conjunction with FIG. 3.

As discussed further below in conjunction with FIG. 4, a user can select one or more of the available identity assurance entropy sources 210 during an enrollment phase, to be subsequently used to obtain access to a protected resource (e.g., after satisfying a predefined enrollment authentication assurance level). Thereafter, during an access attempt, the user can optionally be automatically evaluated using the available identity assurance entropy sources 210, for example, that were previously selected during enrollment.

Figure 3:
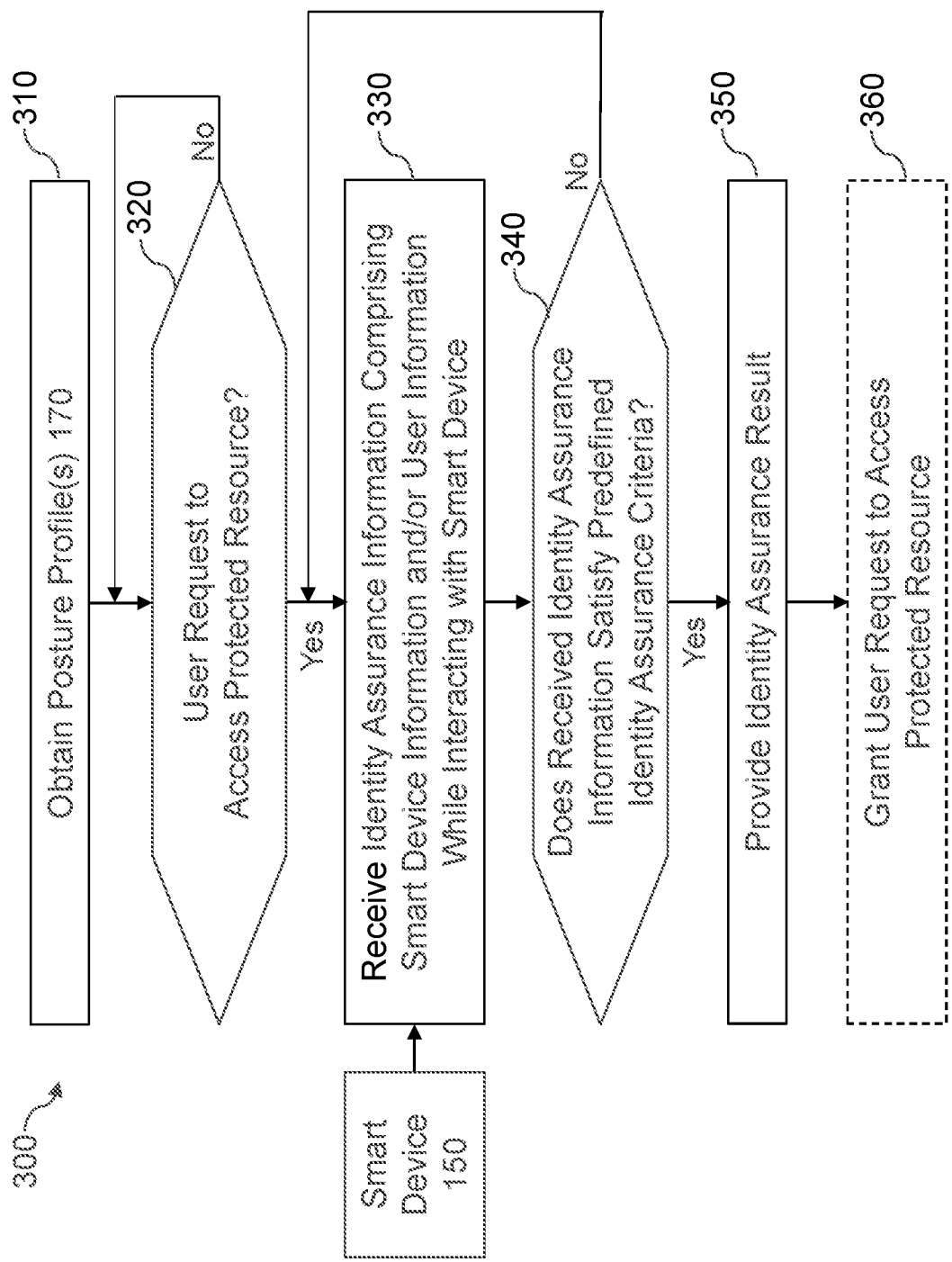
FIG. 3 is a flow chart illustrating an exemplary implementation of a posture profile-based identity assurance evaluation process that uses an identity assurance scoring system, according to some embodiments of the disclosure.

FIG. 3 is a flow chart illustrating an exemplary implementation of a posture profile-based identity assurance evaluation process 300, according to some embodiments of the disclosure. As shown in FIG. 3, one or more posture profiles 170 are obtained during step 310. Thereafter, a test is performed during step 320 to determine if a user request is received to access a protected resource. Once it is determined during step 320 that a user request has been received to access a protected resource, identity assurance information is received from the smart device 150 during step 330, comprising smart device information (e.g., height, tilt and lumbar settings) and/or user information while interacting with smart device (e.g., total user weight, a user weight distribution, and/or a user extremity position).

During step 340, the exemplary posture profile-based identity assurance evaluation process 300 evaluates whether the received identity assurance information satisfies a predefined identity assurance level criteria. If the received identity assurance information satisfies the predefined identity assurance level criteria, then an identity assurance result (e.g., influencing if step-up authentication is required by the protected resource) is provided during step 350. For example, the provided identity assurance result can take various forms, including but not limited to, a binary result (yes/no) regarding whether user is the registered user; a policy could be pushed specifying a probability threshold for evaluating the identity assurance result; a probability or score (e.g., between 0-100) of the likelihood that the user is the registered user; and a stratification of identity assurance (e.g., high, medium, low).

In some embodiments, the exemplary posture profile-based identity assurance evaluation process 300 can, in addition, or alternatively, be used for authentication, e.g., authenticating a person sitting in a car (they would no longer need a key), as described herein. In one or more embodiments, a sufficiently strong identity assurance can allow the requesting entity to decide that no other authentication is needed, thereby authenticating them.

If the received identity assurance information does not satisfy the predefined identity assurance level criteria, then program control optionally returns to step 330 to evaluate additional identity assurance information. In some embodiments, if the identity was not strong enough, the access control system could optionally prompt the user to step-up and authenticate in another manner, e.g., to provide a personal identification number, a fingerprint or another biometric, or a one-time passcode.

The user is optionally granted access to the protected resource during step 360. Identity assurances can also be derived through other means, such as a rules engine. In some embodiments, the underlying rules used by the rules engine can be derived either manually or through a machine learning based approach.

Figure 4:
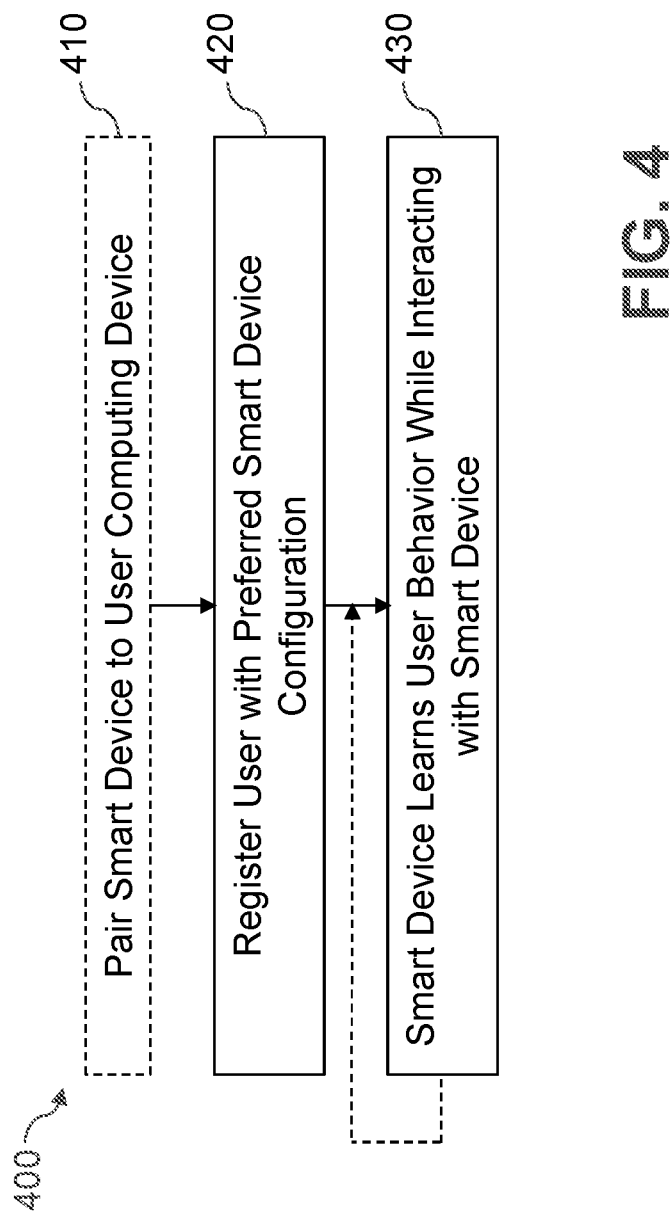
FIG. 4 is a flow chart illustrating an exemplary implementation of an enrollment process that allows a user to select available identity assurance entropy sources to be used for identity assurance, according to one or more embodiments of the disclosure.

FIG. 4 is a flow chart illustrating an exemplary implementation of an enrollment process 400 that optionally allows a user to select available identity assurance entropy sources 210 to be used for identity assurance, according to one or more embodiments of the disclosure. In some embodiments, the user enrolls to use the identity assurance service described herein.

As shown in FIG. 4, a user optionally pairs the smart device 150 with a user computing device (e.g., a laptop) during step 410. Thereafter, the user is registered during step 420, for example, with a preferred smart device configuration (e.g., a preferred seat configuration).

The smart device 150 learns the user behavior during step 430 while interacting with smart device 150 (e.g., user weight, movement patterns, placement of hands and/or feet, and frequency of body position changes). The smart device 150 optionally updates the learned posture profiles 170 as the weight and/or behavior of a given user slowly change over time.

In some embodiments, the disclosed posture profile-based identity assurance techniques can be employed, for example, in an office setting, where it is often common for people to use the same seat every day. The smart seat would communicate, for example, with a primary computing device (e.g., a desktop and/or laptop) of a user and influence authentication. The provided posture profile information could be used by a local authentication service to determine the requirements for unlocking the user device, and/or to influence a required level of authentication to access other protected resources, such as applications and web services.

In an automobile implementation, for example, automobile manufacturers are moving away from traditional car keys and moving towards solutions that use mobile applications, radio frequency (RF)/Bluetooth Low-Energy (BLE) fobs, and/or Near Field Communication (NFC) cards to access the car. There are security concerns created by this evolution, however. By scanning for the emitted signature of a key from outside a home, for example, thieves can capture the signature of the key fob and amplify the signal to gain entry to the car. From there, the thieves disable car-tracking and drive the car away. Multi-factor authentication techniques have been employed, requiring users to enter a personal identification number (PIN) prior to driving the car.

In one or more embodiments, the disclosed posture profile-based identity assurance techniques can be employed to provide a more seamless alternative to a PIN in an automobile setting, for example. The disclosed posture profile-based identity assurance techniques can be applied to any vehicle, such as a bus, train, plane, and construction vehicle, as would be apparent to a person of ordinary skill in the art.

By detecting the weight of the driver, for example, while sitting in a smart seat, an attestation could be made about the identity of the driver. Other information could also be considered, including a number of passengers, the weight of each passenger, the time-of-day, and the seat settings (e.g., seat height, lumbar adjustments, and heated seats on/off). By combining this information together, posture profiles 170 could be created describing typical behavior for the driver(s) and passengers. By comparing the characteristics and behavior of users, a determination can be made about whether step-up authentication should be required to drive the car.

According to another aspect of the disclosure, the posture profile-based identity assurance techniques can be employed for improved access controls. Consider a parent (or another guardian), for example, that wishes to grant permission to a teenage child to drive a family vehicle on a given night between 7 pm and 11 pm. The child could share his or her posture profile 170 with the parent, and the parent can specify that the vehicle should trust the posture profile 170 for a designated date and time. In this manner, the parent can specify that only the child can drive the vehicle and this can be enforced using the posture profile-based identity assurance techniques (and thus, any friends of the child or other persons are blocked from driving the car). Similarly, other policies could be created that dictate the terms and conditions for the specified operator. For example, policies could enforce a speed limit on the vehicle, or define a geofence boundary indicating where the operator is permitted to drive. These policies can address, for example, the permitted day of the week (or month); the time of day; the number of passengers and/or the current weather.

In at least one embodiment of the disclosure, shareable seat profiles are employed that allow a given user to share posture profiles of the user across a plurality of smart devices 150 of the user, such as multiple seats and/or mats of the user.

In addition, the disclosed posture profile-based identity assurance techniques can be employed with continuous authentication. Continuous authentication is an authentication solution whereby the activity of a user is continuously monitored in order to verify the identity of the user throughout a session (e.g., not just at the start of a session). In this case, the smart device 150 could be routinely queried to collect identity assurance data and take appropriate actions. For example, if the smart device 150 indicates that a user has left his or her seat for more than two minutes, a user could be immediately logged out of their session. Similarly, if a pilot of a commercial airliner gets up and somebody else sits in their seat, an alert could be triggered indicating a potential compromise.

Among other benefits, the disclosed posture profile-based identity assurance techniques consider a combination of identity assurance entropy sources 210 presented by a user and evaluate the corresponding assigned identity assurance values 230 to determine if a specified identity assurance criteria is satisfied.

One or more embodiments of the disclosure provide improved methods, apparatus and computer program products for posture profile-based identity assurance. The foregoing applications and associated embodiments should be considered as illustrative only, and numerous other embodiments can be configured using the techniques disclosed herein, in a wide variety of different applications.

It should also be understood that the disclosed posture profile-based identity assurance techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for posture profile-based identity assurance may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based access control engine 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based access control platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
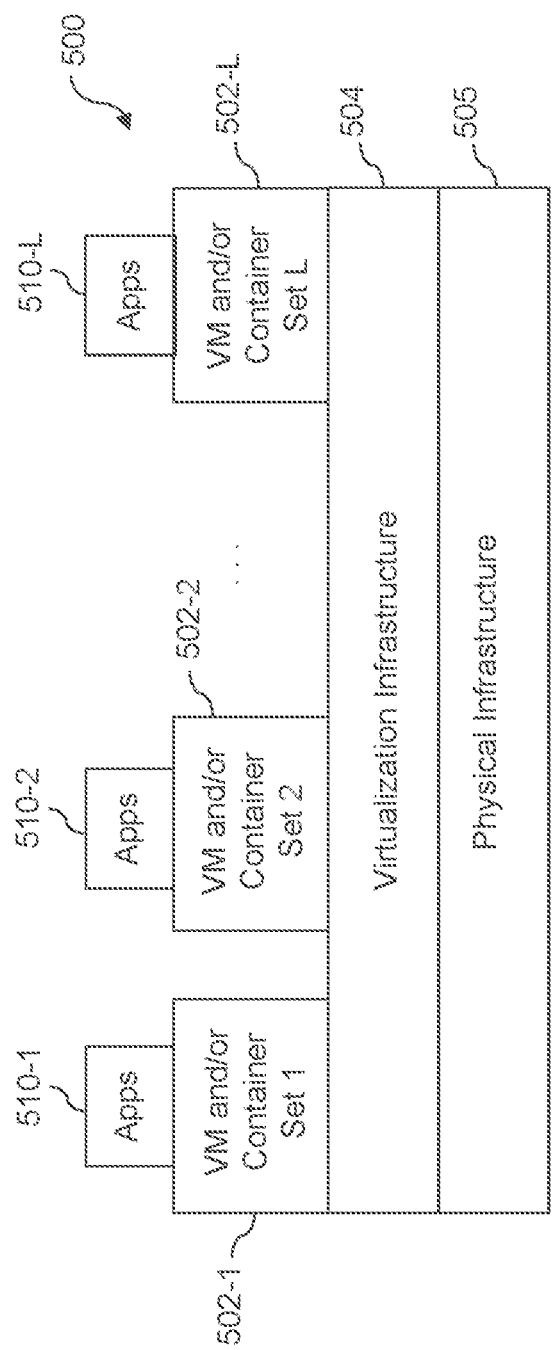
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the access control system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide access control functionality of the type described above for one or more processes running on a given one of the VMs. For example, each of the VMs can implement access control logic and identity assurance scoring for providing access control functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide access control functionality of the type described above for one or more processes running on different ones of the containers. For example, a container host device supporting multiple containers of one or more container sets can implement one or more instances of access control logic and associated identity assurance scoring for providing access control functionality.

As is apparent from the above, one or more of the processing modules or other components of access control system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
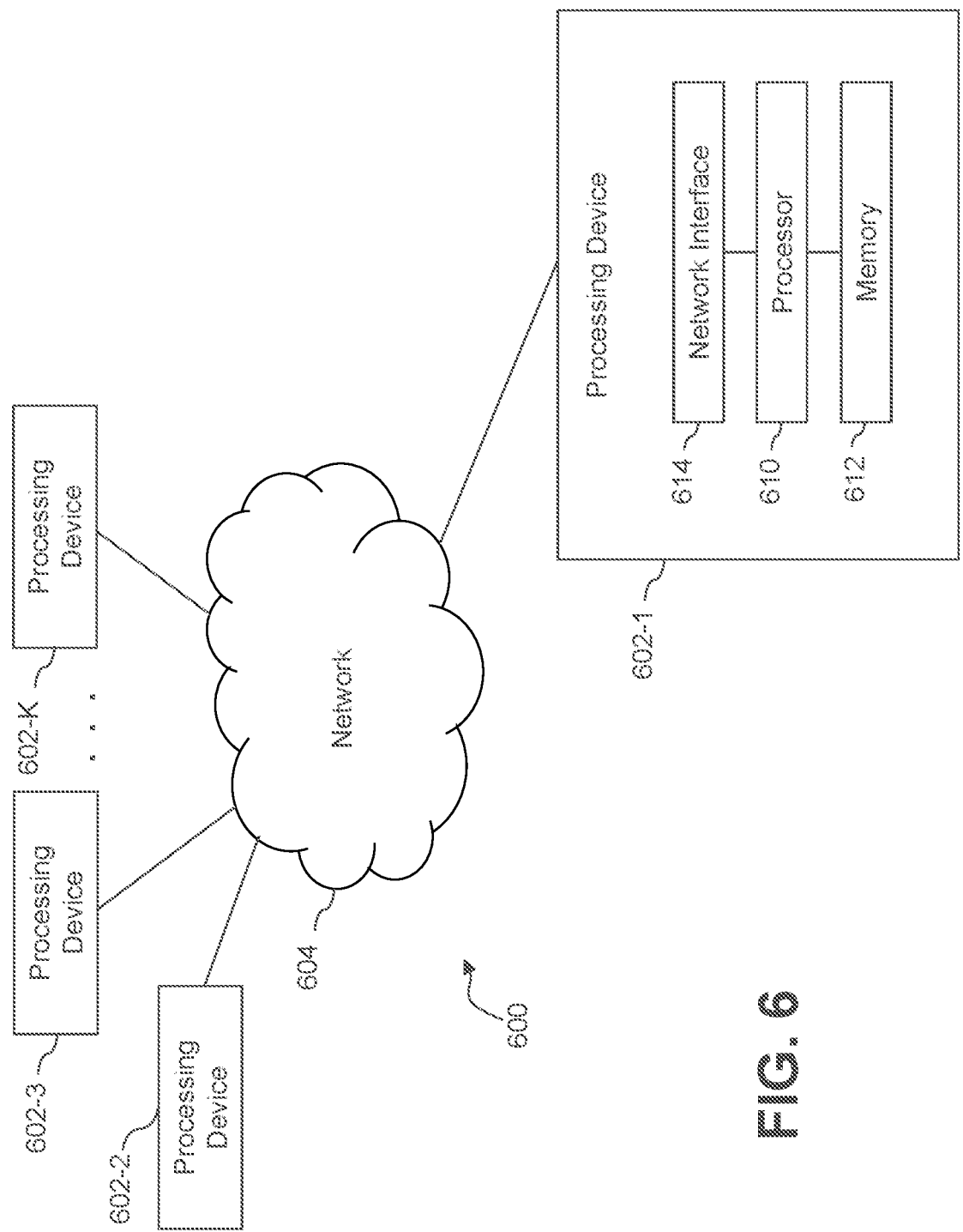
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a posture profile of a user indicating a behavior of the user while one or more of sitting in a seat and standing on a mat;
performing the following steps, using at least one processing device, in response to a request of the user to obtain access to a protected resource:
selecting a predefined access control policy for the protected resource based on the obtained posture profile;
restricting one or more actions of the user with respect to the protected resource based at least in part on the selected predefined access control policy for the protected resource;

receiving identity assurance information comprising one or more of: (i) configuration information about a configuration of one or more of the seat and the mat at a time of the request of the user, and (ii) user information about the user one or more of sitting in the seat and standing on the mat at the time of the request of the user; and determining if the identity assurance information satisfies a predefined identity assurance criteria, wherein the method is performed by at least one processing device comprising a processor coupled to a memory.

2. The method of claim 1, further comprising evaluating the user request to access the protected resource based on the determining.

3. The method of claim 1, wherein the posture profile is obtained based on information from one or more of: (i) a smart device comprising one or more of a smart seat and a smart mat, wherein the smart device measures information about the user while one or more of sitting and standing; and (ii) a visual analysis of images of the user while one or more of sitting and standing.

4. The method of claim 3, wherein the smart device provides configuration information about a configuration of the smart seat, wherein the configuration information comprises one or more of a height of the smart seat, a location of the smart seat, a tilt setting of the smart seat, a lumbar setting of the smart seat, an arm height of the smart seat and a rotation of the smart seat.

5. The method of claim 3, wherein the smart device provides user information about the user interacting with the smart device, wherein the user information comprises one or more of a total weight of the user, a weight distribution of the user, a position of one or more body parts of the user, a frequency of the user changing position, and movement patterns of the user.

6. The method of claim 1, further comprising determining an identity assurance result comprising one or more of a binary result, a score indicating how likely that the user is a registered user and an assignment to one of a plurality of predefined identity assurance confidence levels.

7. The method of claim 1, wherein the obtained posture profile of the user is updated over time.

8. The method of claim 1, wherein the obtained posture profile of the user is shareable across one or more of a plurality of seats of the user and a plurality of mats of the user.

9. A system, comprising:
a memory; and
at least one processing device, coupled to the memory, operative to implement the following steps:
obtaining a posture profile of a user indicating a behavior of the user while one or more of sitting in a seat and standing on a mat;
performing the following steps, using at least one processing device, in response to a request of the user to obtain access to a protected resource:
selecting a predefined access control policy for the protected resource based on the obtained posture profile;
restricting one or more actions of the user with respect to the protected resource based at least in part on the selected predefined access control policy for the protected resource;
receiving identity assurance information comprising one or more of: (i) configuration information about a configuration of one or more of the seat and the mat at a time of the request of the user, and (ii) user information about the user one or more of sitting in the seat and standing on the mat at the time of the request of the user; and
determining if the identity assurance information satisfies a predefined identity assurance criteria.

10. The system of claim 9, wherein the posture profile is obtained based on information from one or more of: (i) a smart device comprising one or more of a smart seat and a smart mat, wherein the smart device measures information about the user while one or more of sitting and standing; and (ii) a visual analysis of images of the user while one or more of sitting and standing.

11. The system of claim 10, wherein the smart device provides one or more of: (i) configuration information about a configuration of the smart seat, wherein the configuration information comprises one or more of a height of the smart seat, a location of the smart seat, a tilt setting of the smart seat, a lumbar setting of the smart seat, an arm height of the smart seat and a rotation of the smart seat; and (ii) user information about the user interacting with the smart device, wherein the user information comprises one or more of a total weight of the user, a weight distribution of the user, a position of one or more body parts of the user, a frequency of the user changing position, and movement patterns of the user.

12. The system of claim 9, wherein the obtained posture profile of the user is updated over time.

13. The system of claim 9, wherein the obtained posture profile of the user is shareable across one or more of a plurality of seats of the user and a plurality of mats of the user.

14. A computer program product, comprising a tangible machine-readable storage medium having encoded therein executable code of one or more software programs, wherein the one or more software programs when executed by at least one processing device perform the following steps:
obtaining a posture profile of a user indicating a behavior of the user while one or more of sitting in a seat and standing on a mat;
performing the following steps, using at least one processing device, in response to a request of the user to obtain access to a protected resource:
selecting a predefined access control policy for the protected resource based on the obtained posture profile;
restricting one or more actions of the user with respect to the protected resource based at least in part on the selected predefined access control policy for the protected resource;
receiving identity assurance information comprising one or more of: (i) configuration information about a configuration of one or more of the seat and the mat at a time of the request of the user, and (ii) user information about the user one or more of sitting in the seat and standing on the mat at the time of the request of the user; and
determining if the identity assurance information satisfies a predefined identity assurance criteria.

15. The computer program product of claim 14, wherein the posture profile is obtained based on information from one or more of: (i) a smart device comprising one or more of a smart seat and a smart mat, wherein the smart device measures information about the user while one or more of sitting and standing; and (ii) a visual analysis of images of the user while one or more of sitting and standing.

16. The computer program product of claim 15, wherein the smart device provides one or more of: (i) configuration information about a configuration of the smart seat, wherein the configuration information comprises one or more of a height of the smart seat, a location of the smart seat, a tilt setting of the smart seat, a lumbar setting of the smart seat, an arm height of the smart seat and a rotation of the smart seat; and (ii) user information about the user interacting with the smart device, wherein the user information comprises one or more of a total weight of the user, a weight distribution of the user, a position of one or more body parts of the user, a frequency of the user changing position, and movement patterns of the user.

17. The computer program product of claim 14, wherein the obtained posture profile of the user is shareable across one or more of a plurality of seats of the user and a plurality of mats of the user.

18. The system of claim 9, further comprising evaluating the user request to access the protected resource based on the determining.

19. The computer program product of claim 14, further comprising evaluating the user request to access the protected resource based on the determining.

20. The computer program product of claim 14, further comprising determining an identity assurance result comprising one or more of a binary result, a score indicating how likely that the user is a registered user and an assignment to one of a plurality of predefined identity assurance confidence levels.

\* \* \* \* \*